US005756972A

United States Patent [19]

Vranicar et al.

[11] Patent Number: 5,756,972
[45] Date of Patent: May 26, 1998

[54] HINGED CONNECTOR FOR HEATING CABLES OF VARIOUS SIZES

[75] Inventors: Anthony Vranicar, Santa Clara; Richard S. Huang, Saratoga; Larry M. Edwards, Fremont; Carl F. Landers, Foster City; Wesley Dong, Belmont; Frank Wasilewski, Redwood City, all of Calif.

[73] Assignee: Raychem Corporation, Menlo Park, Calif.

[21] Appl. No.: 328,644

[22] Filed: Oct. 25, 1994

[51] Int. Cl.⁶ .............................. H05B 3/08; H01R 13/52
[52] U.S. Cl. .................. 219/541; 439/119; 439/275; 439/459; 174/65 G
[58] Field of Search .................. 219/541; 439/98, 439/110, 119, 210, 274–275, 271, 459, 456–457, 910; 174/652, 656, 65 SS, 135, 59; 285/382.7

[56] References Cited

U.S. PATENT DOCUMENTS

| 962,589 | 6/1910 | Ryan | 439/414 |
|---|---|---|---|
| 2,000,318 | 5/1935 | Cannon | 178/328 |
| 2,870,420 | 1/1959 | Malek | 333/33 |
| 3,020,518 | 2/1962 | Camping et al. | |
| 3,064,227 | 11/1962 | Sams et al. | |
| 3,076,169 | 1/1963 | Blaisdell | |
| 3,104,145 | 9/1963 | Somerset | |
| 3,110,756 | 11/1963 | Genung et al. | 174/89 |

(List continued on next page.)

FOREIGN PATENT DOCUMENTS

| 28 35 832 | 3/1980 | Germany |
| 2937228 | 9/1982 | Germany |
| 3420021 | 2/1989 | Germany |
| 4108677 | 9/1992 | Germany |
| 2260864 | 4/1993 | United Kingdom |
| WO91/05014 | 4/1981 | WIPO |
| WO86/01634 | 3/1986 | WIPO |
| WO86/00603 | 1/1988 | WIPO |
| WO90/05166 | 5/1990 | WIPO |
| WO93/23472 | 11/1993 | WIPO |

OTHER PUBLICATIONS

Heyco Catalog 194, "New Fittings for Heyco–Flex III and IV Tubing", date unknown.
Sealcon Inc. Brochure, "Liquid Tight Strain Relief Connector for Cable Wire and Tubing", date unknown.
Thomas & Bettss brochure, "The XTRAFLEX Raceway System", Oct. 1990.
Search Report for International Application No. PCT/US95/13920, dated Jun. 12, 1996.

*Primary Examiner*—Teresa J. Walberg
*Assistant Examiner*—Raphael Valencia
*Attorney, Agent, or Firm*—Marguerite E. Gerstner; Timothy H.P. Richardson; Herbert G. Burkard

[57] ABSTRACT

A connector for connecting an end of a first elongate electrical heating cable to an end of a first elongate electrical component such as another heating cable or a power cable. The connector includes first and second shell members which can be in a mated or demated configuration and which, when mated, form a shell having a first inlet port for the first heating cable and a second inlet port for the first electrical component. In addition, the connector includes an element for connecting electrodes of the first heating cable to elongate members of the first electrical component and a sealing assembly for holding the first heating cable in position in the first inlet port. The sealing assembly includes a hollow cylindrical ring from which gripping elements in the form of fingers extend perpendicular to the plane of the ring, a nut for making connection to the first inlet port, and a grommet which is held by the fingers and which grips the first heating cable. Also described is a connector which comprises a mirror which is inserted in a connection module containing an element for connection, the mirror being positioned so that the element for connection can be observed from outside the module. The mirror can be used as a visual indicator allowing the installer to determine when the elongate electrical component or heating cable is correctly positioned for connection.

20 Claims, 10 Drawing Sheets

U.S. PATENT DOCUMENTS

| | | | |
|---|---|---|---|
| 3,129,048 | 4/1964 | Broch . | |
| 3,141,718 | 7/1964 | Schott et al. . | |
| 3,227,991 | 1/1966 | Zdanis . | |
| 3,408,616 | 10/1968 | Greenbaum . | |
| 3,414,867 | 12/1968 | Travis . | |
| 3,564,117 | 2/1971 | Scheffler et al. | 174/89 |
| 3,603,912 | 9/1971 | Kelly . | |
| 3,688,246 | 8/1972 | Toedtman et al. . | |
| 3,717,840 | 2/1973 | Vaughan et al. . | |
| 3,739,076 | 6/1973 | Schwartz | 174/78 |
| 3,760,331 | 9/1973 | Gurley . | |
| 3,858,144 | 12/1974 | Bedard et al. | 338/22 R |
| 3,861,029 | 1/1975 | Smith-Johannsen et al. | 29/611 |
| 3,879,099 | 4/1975 | Shaffer . | |
| 3,916,149 | 10/1975 | Skinner | 219/335 |
| 3,936,126 | 2/1976 | Miller . | |
| 3,976,351 | 8/1976 | Hopfe . | |
| 3,990,765 | 11/1976 | Hill . | |
| 4,017,715 | 4/1977 | Whitney et al. | 219/553 |
| 4,103,984 | 8/1978 | Mixon, Jr. . | |
| 4,145,075 | 3/1979 | Holzmann | 285/81 |
| 4,148,539 | 4/1979 | Hardesty . | |
| 4,153,326 | 5/1979 | Frantz et al. | 439/293 |
| 4,242,573 | 12/1980 | Batliwalla | 219/528 |
| 4,243,290 | 1/1981 | Williams . | |
| 4,334,148 | 6/1982 | Kampe | 219/553 |
| 4,334,351 | 6/1982 | Sopory | 29/611 |
| 4,340,270 | 7/1982 | Wilmes et al. . | |
| 4,397,516 | 8/1983 | Koren et al. . | |
| 4,413,872 | 11/1983 | Rudy, Jr. et al. . | |
| 4,426,125 | 1/1984 | Crawford . | |
| 4,426,339 | 1/1984 | Kamath et al. | 264/22 |
| 4,459,473 | 7/1984 | Kamath | 219/553 |
| 4,461,528 | 7/1984 | Durand et al. . | |
| 4,525,000 | 6/1985 | Bachle | 285/177 |
| 4,541,680 | 9/1985 | Johnston . | |
| 4,566,745 | 1/1986 | Maros . | |
| 4,574,188 | 3/1986 | Midgley et al. | 219/549 |
| 4,583,811 | 4/1986 | McMills . | |
| 4,588,249 | 5/1986 | Blichasz . | |
| 4,600,261 | 7/1986 | Debbaut . | |
| 4,602,840 | 7/1986 | Romatzick . | |
| 4,623,753 | 11/1986 | Feldman et al. | 174/50 |
| 4,629,274 | 12/1986 | Pollock . | |
| 4,637,639 | 1/1987 | Jorgensen et al. | 285/249 |
| 4,640,569 | 2/1987 | Dola et al. . | |
| 4,652,071 | 3/1987 | DeBortoli et al. . | |
| 4,684,195 | 8/1987 | Anderson et al. | 439/404 |
| 4,690,831 | 9/1987 | Uken et al. | 427/44 |
| 4,701,138 | 10/1987 | Key | 439/417 |
| 4,716,183 | 12/1987 | Gamarra et al. | 522/80 |
| 4,722,699 | 2/1988 | Heng et al. | 439/396 |
| 4,733,015 | 3/1988 | Barnes | 174/65 R |
| 4,744,769 | 5/1988 | Grabbe et al. | 439/284 |
| 4,759,725 | 7/1988 | Finch | 439/439 |
| 4,761,146 | 8/1988 | Sohoel | 439/584 |
| 4,767,235 | 8/1988 | Holzmann | 285/27 |
| 4,777,063 | 10/1988 | Dubrow et al. | 427/44 |
| 4,789,759 | 12/1988 | Jones | 174/65 SS |
| 4,790,765 | 12/1988 | Ehrenfels et al. | 439/96 |
| 4,793,822 | 12/1988 | Cozzens et al. | 439/397 |
| 4,810,210 | 3/1989 | Komatsu | 439/610 |
| 4,826,449 | 5/1989 | Debortoli et al. | 439/411 |
| 4,846,721 | 7/1989 | Debruycker et al. | 439/411 |
| 4,864,725 | 9/1989 | Debbaut et al. | 29/871 |
| 4,865,905 | 9/1989 | Uken et al. | 428/220 |
| 4,883,945 | 11/1989 | Bautista | 219/541 |
| 4,887,971 | 12/1989 | Reuss et al. | 439/98 |
| 4,891,022 | 1/1990 | Chandler et al. | 439/610 |
| 4,897,046 | 1/1990 | Tengler et al. | 439/579 |
| 4,900,068 | 2/1990 | Law | 285/161 |
| 4,911,655 | 3/1990 | Pinyan et al. | 439/412 |
| 4,929,189 | 5/1990 | Sekiguchi | 439/352 |
| 4,952,174 | 8/1990 | Sucht et al. | 439/584 |
| 4,963,104 | 10/1990 | Dickie | 439/460 |
| 4,971,573 | 11/1990 | Pinyan | 439/412 |
| 4,995,830 | 2/1991 | Eckhaus | 439/409 |
| 5,041,012 | 8/1991 | Caprio | 439/413 |
| 5,048,872 | 9/1991 | Gehring | 285/92 |
| 5,051,541 | 9/1991 | Bawa et al. | 174/65 SS |
| 5,062,806 | 11/1991 | Ohno et al. | 439/490 |
| 5,069,636 | 12/1991 | Shimirak et al. | 439/412 |
| 5,079,300 | 1/1992 | Dubrow et al. | 525/106 |
| 5,088,934 | 2/1992 | Chow et al. | 439/395 |
| 5,102,351 | 4/1992 | Meshel | 439/607 |
| 5,104,930 | 4/1992 | Rinde et al. | 524/871 |
| 5,106,323 | 4/1992 | Gerhard | 439/410 |
| 5,111,032 | 5/1992 | Batliwalla et al. | 219/549 |
| 5,116,230 | 5/1992 | Dechelette et al. | 439/101 |
| 5,127,853 | 7/1992 | McMills et al. | 439/578 |
| 5,145,388 | 9/1992 | Brownlie et al. | 439/142 |
| 5,149,736 | 9/1992 | Gamarra | 524/490 |
| 5,151,053 | 9/1992 | Shinji et al. | 439/610 |
| 5,174,783 | 12/1992 | Stassen et al. | 439/410 |
| 5,378,174 | 1/1995 | Brownlie et al. | 439/709 |

1

HINGED CONNECTOR FOR HEATING CABLES OF VARIOUS SIZES

BACKGROUND OF THE INVENTION

1. Field of the Invention

This invention relates to connectors for elongate cables, e.g. electrical heating cables.

2. Introduction to the Invention

Elongate electrical heating cables are well known and are used, for example, to prevent the freezing of pipes or to maintain temperatures within pipes or other conduits. Particularly useful elongate heating cables, also referred to herein as heaters, comprise (a) first and second elongate electrodes, (b) a plurality of resistive heating elements connected in parallel between the electrodes, e.g. a continuous strip of a conductive polymer in which the electrodes are embedded or which is wrapped around the electrodes, and (c) an insulating jacket which surrounds the electrodes and the heating elements. For many applications the insulating jacket is surrounded by a metallic grounding layer, e.g. a metal braid. It is often necessary to make an electrical connection from the elongate electrical heating cable to another element, e.g. another heating cable or a power cable. Conventional methods such as grommets, crimps, or heat-shrinkable sleeves can be used to make such connections, although these methods generally do not provide adequate strain relief of the elongate heating cable or adequate sealing to prevent moisture from contacting the connection. Alternatively, connections can be made by using a connection module such as those described in U.S. Pat. Nos. 4,883,945 (Bautista) and 5,174,783 (Stassen et al), the disclosures of which are incorporated herein by reference. These connectors have drawbacks, however. When using the connector disclosed by Bautista, it is necessary to remove the conductive polymer composition from the electrodes in order to make good contact. This procedure is craft sensitive and can be tedious. To use the connector disclosed by Stassen, it is necessary to disassemble the connector prior to insertion of the heating cable, giving a number of pieces which can be dropped or easily misplaced. Furthermore, various tools are required to assemble the connector and make adequate connection between the heating cable and the electrical component.

SUMMARY OF THE INVENTION

We have now discovered that a connector can be made which is easy to use, requires minimal assembly and tools, accepts a wide range of heating cable sizes, provides visual feedback to assure proper installation, and is reenterable. In a first aspect, this invention provides a connector for connecting an end of a first elongate electrical heating cable to an end of a first elongate electrical component, said first heating cable comprising (a) first and second elongate electrodes, (b) a plurality of resistive heating elements connected in parallel between said electrodes, and (c) an insulating jacket surrounding said electrodes and heating elements, and said first electrical component comprising a first elongate member for connection to the first electrode and a second elongate member for connection to the second electrode, said connector comprising (1) first and second shell members which can be in
  (a) a demated configuration, or
  (b) a mated configuration in which the shell members are in contact with each other and form a shell having
    (i) a first inlet port for the first heating cable, the first inlet port being a hollow cylinder having an entry at

2 one end and an outer surface at least a part of which comprises screw threads, and (ii) a second inlet port for the first electrical component;

(2) securing means for releasably maintaining the shell members in the mated configuration;

(3) a first connection means for connecting the first electrode to the first elongate member of said first electrical component within the shell;

(4) a second connection means for connecting the second electrode to the second elongate member of said first electrical component within the shell; and (5) a sealing assembly suitable for sealing the first heating cable at the entry of the first inlet port, said assembly comprising
  (a) a hollow cylindrical ring (i) suitable for mating to the first inlet port and (ii) from which fingers extend perpendicular to the plane of the ring,
  (b) a nut which can be screwed onto the threads of the first inlet port, and
  (c) a grommet which is held by the fingers and which seals around the first heating cable after installation, said first and second connection means being positioned within a first connection module which fits within the shell when the first and second shell members are in the mated configuration.

We have also discovered that particular components that are part of the connector described in the first aspect of the invention are themselves useful, either as part of a connector or other device or by themselves. For example, we have found that a sealing assembly in which the gripping elements, i.e. fingers, and the enclosure into which they are inserted, e.g. an inlet port, are separate elements which may be prepared from different materials provides advantages over conventional sealing assemblies. For adequate sealing it is necessary that the fingers be flexible in order to conform to the surface of the heating cable and/or to provide adequate sealing force to the grommet-heating cable interface when the nut is tightened. Conventional assemblies, in which the enclosure and the gripping elements are a single component, are thus prepared from a relatively soft and flexible material which may not have the necessary strength, rigidity, or heat resistance to withstand installation and impact. By using the assembly of the invention in which there are two separate components, the fingers can be made to be flexible and the enclosure can be prepared from a material, e.g. an engineering plastic with different physical properties. Furthermore, the sealing assembly can be used with a grommet. If the connector of the first aspect of the invention comprises a separate strain relief system, a relatively soft grommet, which can be tightened sufficiently by hand without the need for special tools, can be used. This is in contrast to conventional sealing assemblies in which the grommet must provide strain relief and therefore be hard enough to provide strain relief for the sealed element. The assembly must be disassembled to insert the element through the hard grommet, and tools must be used to tighten the nut sufficiently. Thus, in a second aspect, the invention provides a sealing assembly which comprises (1) a first component which (a) is a hollow cylinder having an outer surface at least a part of which comprises screw threads, and (b) is composed of a first material;

(2) a second component which (a) is a hollow cylindrical ring from which fingers extend perpendicular to the plane of the ring, said fingers being composed of a second material which (i) is a polymeric composition and (ii) has a flexural modulus of at most 500,000 psi and an ultimate elongation of at least 100%, and (b) is suitable for mating to the first component; and (3) a third component which (a) is a nut, and (b) can be screwed onto the threads of the first component.

We have also found a useful means of providing visual feedback, to allow the installer to determine when the elongate electrical component or heating cable is correctly positioned. In a third aspect, the invention provides a connector for making an electrical connection to an elongate electrical component, said connector comprising (1) a connection module;

(2) a connection means for connecting to a first electrode of the elongate electrical component, said connection means being inserted in the module; and (3) a mirror which (a) is inserted in the module, and (b) is positioned so that the connection means can be observed from outside the module.

BRIEF DESCRIPTION OF THE DRAWING

The invention is illustrated by the drawing in which

FIG. 6a shows the capture means before the heating cable is inserted and FIG. 6b shows the capture means after insertion of the heating cable;

FIG. 11a shows the connection means before an electrical connection is made and FIG. 11b shows the connection means after an electrical connection is made; and FIGS. 12a and 12b are plan views of the surface of the connection module of FIG. 10 in which FIG. 12a shows reflection in the mirror before an electrical connection is made and FIG. 12b shows the reflection in the mirror after an electrical connection is made.

DETAILED DESCRIPTION OF THE INVENTION

Figure 1:
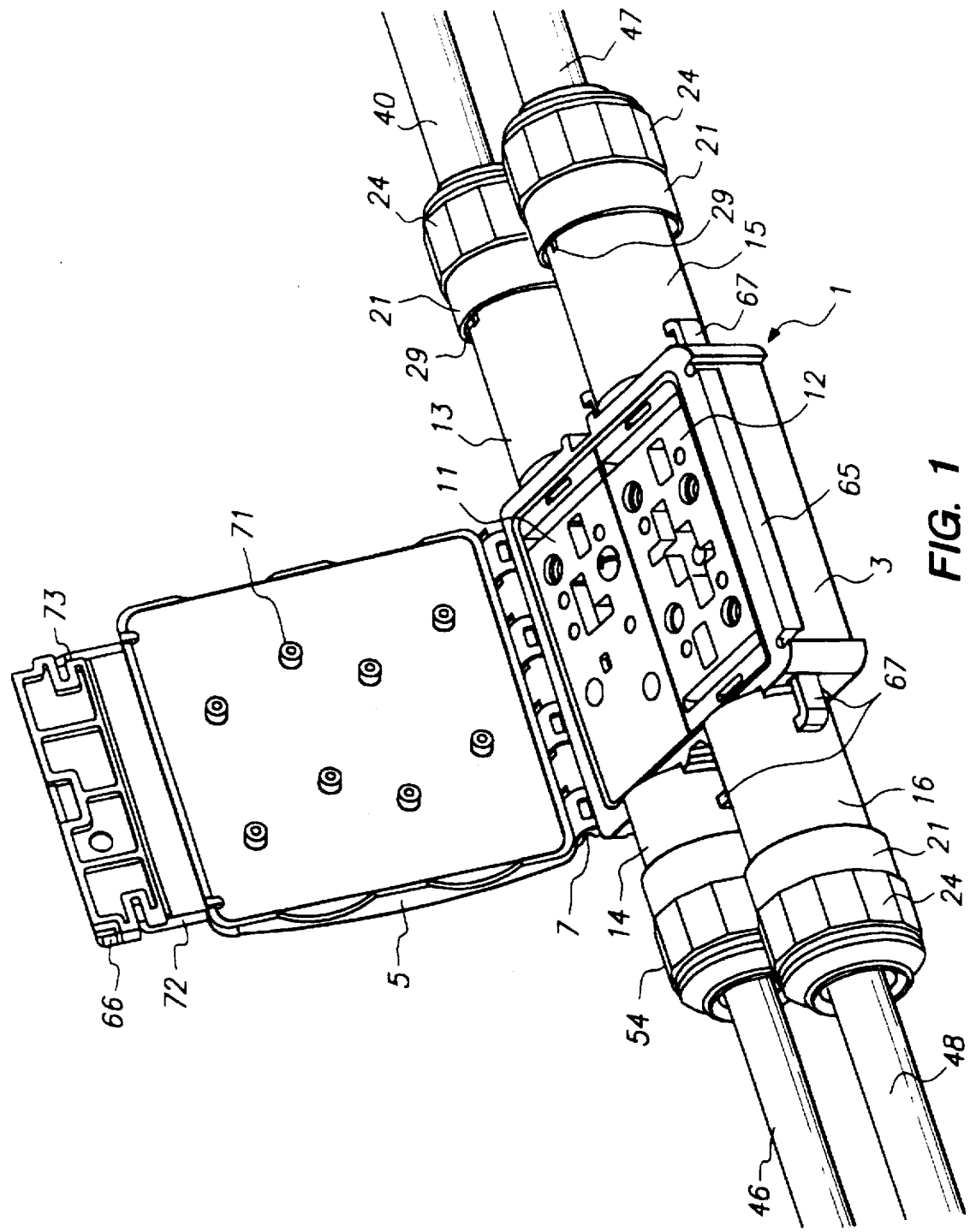
FIG. 1 is a perspective view of a connector of the invention suitable for connecting a heating cable to three elongate electrical components.

Elongate electrical heating cables (also referred to herein as heaters) appropriate for use with this connector are those which comprise first and second elongate electrodes, a plurality of resistive heating elements connected in parallel between the electrodes, and at least one insulating jacket surrounding the electrodes and heating elements. The insulating jacket is generally polymeric, in the form of a continuous polymer layer, although a polymeric braid or a polymer tape may be used. For some applications a polymeric insulating jacket is surrounded by a second layer, e.g. a second polymeric insulating layer such as a polyester tape, or a metallized tape such as aluminized polyester. The heating cable often comprises an optional metallic grounding braid surrounding the insulating jacket and the optional second layer. The metallic grounding braid serves to electrically ground the heating cable and also provides mechanical strength and abrasion resistance. When a metallic grounding braid is present, it generally is in the form of braided metal wires, although for applications in which flexibility is not critical, it is possible to use another type of metal layer, e.g. a sheath or metal tape. In this specification, the term "metallic grounding braid" is intended to include non-braided metal layers. In some applications, the grounding braid itself is surrounded by an insulating jacket to provide environmental and electrical insulation to the heating cable. Particularly suitable heating cables are self-regulating strip heaters in which the electrodes are elongate wires and the heating elements comprise a conductive polymer composition. Heaters of this type are described in U.S. Pat. Nos. 3,858,144 (Bedard et al), 3,861,029 (Smith-Johannsen et al), 4,017,715 (Whitney et al), 4,242,573 (Batliwalla), 4,334,148 (Kampe), 4,334,351 (Sopory), 4,426,339 (Kamath et al), 4,459,473 (Kamath), 4,574,188 (Midgley et al), and 5,111,032 (Batliwalla et al), the disclosures of which are incorporated herein by reference. The heating cable generally has an approximately rectangular cross-section with two generally parallel faces, although other geometries, e.g. round, oval, or elliptical, can also be used.

The elongate electrical component to be connected to the heating cable may comprise one or more heating cables, a power cable or cord, a grounded power lead, a plurality of electrical cables, or another suitable element. In order to make adequate connection to the heating cable, the component will comprise a first elongate member for connection to the first electrode, and a second elongate member for connection to the second electrode. In many embodiments, the component also comprises a third elongate member which is connected to a grounding element in the connector and to the metal grounding braid, if present. The exact configuration of the component and the heating cable, as well as the type of electrical connection desired, will define the exact configuration of the connector. Possible connections include a splice between two heating cables, a power connection between the heating cable and a power cable, a "tee" connecting the heating cable to two other heating cables, a cross in which four heating cables are connected, a powered splice in which the heating cable is connected to another heating cable and to a power cable, and a powered tee in which a power cable is connected to the heating cable as well as two other heating cables.

The connector comprises first and second shell members which are capable of existing in a demated or a mated configuration. In the demated configuration, the shell members may be separate pieces or they may be connected, e.g. by hinges. When mated, the shell members are in contact with each other, either directly or indirectly through a sealing member such as a gasket, and as such, form a shell which provides a first inlet port for the heating cable and a second inlet port for the first elongate component. In order to facilitate connection of the heating cable and the elongate component, the first and second inlet ports are generally positioned at opposite ends of the shell, although for some situations, it is preferred that the first and second ports be at right angles to one another or on the same side adjacent one another. In some applications, the shell also provides a third inlet port for a second elongate component and a fourth inlet port for a third elongate component. Alternatively, the second inlet port may be suitable for insertion of two or more elongate components which may be adjacent one another in a stacked or side-by-side arrangement, or may be positioned on different faces of the shell from the first inlet port. The shell members are maintained in their mated configuration by means of a securing means, e.g. a strap, a latch, a spring clamp, a bracket, one or more screws, or integral snaps. The securing means may be removable in order to allow the shell members to be demated from one another and allow the connector to be reenterable. In a preferred embodiment, the securing means comprises a lever and a bail which attaches the lever to one shell member. The lever is configured to snap over a lip on the other shell member to ensure that the shell members are securely mated.

Although the first and second shell members may be symmetrical in their exterior shape, generally it is the first shell member which is in contact with the pipe or other substrate on which the connector is positioned. As a result, the first shell member often is designed with supports, e.g. feet, on its exterior bottom surface to allow proper positioning on the substrate. Elements to promote attachment to the substrate are also often present, e.g. loops which allow cables or cable ties to pass through for connection to the substrate or loops which can be snapped into a mounting bracket. In addition, the first shell member often is equipped with reentry indicators, i.e. tabs which are positioned for example on the lid snap lever or in recesses of the first shell member, and which break when the connector is improperly reentered, thus providing an indication of an attempt to reenter.

Positioned within one shell member, generally the first shell member, is a first connection module. This module is preferably made from a polymer, e.g. polycarbonate, polysulfone, or acrylic, which is transparent when shaped into the module configuration, thus allowing the installer to monitor the position of the heating cable and the elongate component during installation. The module comprises two major elements: connection means and a strain relief means. Although the module always comprises both first connection means for connection of the first electrode of the heating cable to the first elongate member of the first electrical component and second connection means for connection of the second electrode to the second elongate member of the first electrical component, it may also comprise additional connection means, e.g. fourth, fifth, seventh, eighth, tenth, and eleventh connection means, when multiple elongate components are present. In a preferred embodiment for use when multiple elongate components are present, both a first connection module comprising the first and second connection means and a second connection module comprising fourth and fifth connection means are positioned within one shell member. The connection means may comprise any suitable components for making an electrical connection, e.g. a terminal block or an insulation displacement connector (IDC). Particularly preferred is the use of an IDC which comprises at least two parts, a first piercing unit and a second piercing unit, the two piercing units being physically and electrically connected by a screw. The piercing units are designed with metal teeth or other conductive elements. As the screw is tightened, the first and second piercing units penetrate the outer insulating jacket and the resistive element of the heating cable to make physical and electrical contact with the first and second electrodes of the heating cable. Other conventional components of a screw connection, e.g. washers and springs, may also be present, e.g. to maintain constant pressure. In order to ensure that the IDC is adequately tightened, a visual indication means is generally provided. This visual indicator may be in the form of a pin which assumes a specific position, e.g. becomes flush with the surface of the connection module, when the IDC is appropriately tight, or in the form of a mirror which allows visual monitoring of the connection process. The mirror, which is suitable for use in monitoring electrical or physical connections for devices other than connectors of the invention, is located within the transparent connection module or other transparent body in a position which allows an installer viewing the surface of the module from above to observe the connection. A cavity is cut into the module and at least one surface of the cavity which faces the connection means is positioned at an angle C to the laminar surface of the module which allows viewing, wherein C is typically 20° to 70°, preferably 30° to 60°, e.g. 45°. A mirror is placed on at least part of the angled surface in a position which faces the connection means. The mirror may be metal, e.g. aluminum or other highly reflective material, which is directly in contact with the material of the module. Alternatively, the mirror may comprise a piece of metallized polymer which is attached by an adhesive layer to the module. Particularly preferred is aluminized polyester. When the installer looks at the mirror during installation of a connection, a gap reflecting the open connection, e.g. the screw threads of an IDC, is observed. As the connection is made, e.g. as the IDC screw is tightened, a change is observed in the mirror, e.g. the screw threads are no longer visible. For applications in which the module or body in which the cavity is positioned is not transparent, the mirror can be positioned so that there is no opaque material between the connection means and the mirror. For example, an opening can be cut in the module or body to allow reflection of the connection means by the mirror.

In addition to first and second connection means, the connection module may also contain a third connection means that connects the third elongate member of the first elongate component to a grounding element. When the heating cable contains a metallic grounding braid, the third connection means provides for electrical connection of the grounding element and the third elongate member to the braid. The grounding element may be any suitable metal bus, e.g. a copper or brass strip. If multiple elongate components are present, two or more grounding elements may be present in one or more of the first and second connection modules. Electrical connection may be made between the grounding elements by means of a cross-piece or jumper. The third connection means may be a quick disconnect crimp terminal (e.g. a spade or lug), screw, snap, insulation displacement connector, rivet, crimp, pin and socket, or other element.

Also present in the connection module is a means for strain relief. When making a connection, it is important that the heating cable be held in position with sufficient strength so that it cannot readily be pulled out of the connector. Generally a "pullout force" of at least 25 pounds (11.4 kg), preferably at least 30 pounds (13.6 kg), particularly at least 35 pounds (15.9 kg) is required for routine use. (The pullout force can be measured with an Instron™ tensile testing apparatus. The heating cable is gripped by one jaw of the Instron tester and the connector by the other jaw. The force required to pull the heating cable 0.125 inch (3.18 mm) out of the connector when the jaw holding the connector is stationary and the jaw holding the heating cable is moved is measured.) The strain relief means allows adequate pullout force to be generated when the heating cable is installed in the connector. In a preferred embodiment the strain relief means comprises an assembly which is positioned in a slot in the connection module. The assembly comprises at least two gripping teeth. The first and the second gripping teeth are positioned on the assembly so that, when a heating cable is inserted into the connector, the first and second gripping teeth are forced against opposite faces of the heating cable. Complete insertion and sufficient strain relief is achieved when the insulating jacket of the heating cable is directly contacted by at least the first gripping tooth and the second gripping tooth. The first and second gripping teeth do not cover the entire circumference of the heating cable and thus the strain relief assembly is suitable for heating cables in a variety of widths. In addition, the assembly may comprise a single piece in which the first gripping tooth is secured to the top portion of the housing and the second gripping tooth is secured to the bottom portion of the housing. In a preferred embodiment, the assembly has an L shape, with the first gripping tooth secured to the vertical portion of the L and the second gripping tooth secured to the horizontal portion of the L, the vertical and horizontal portions being separated by a hinge. This design allows the strain relief means to be used with heating cables of a variety of thicknesses due to the flexing of the horizontal portion. In use, the assembly is inserted into an opening in the connection module and is "closed" by bending the vertical portion into a position parallel to the horizontal portion, and snapping the end of the vertical portion onto a closure means at the end of the horizontal portion thus creating an opening for the heating cable. By opening the closure means, the assembly can be reentered. The gripping teeth are generally of rectangular cross-section, although other shapes may be used. The teeth are preferably angled from the base of the tooth away from the opening, i.e. the direction into which the heating cable will be inserted, so that the side of the tooth facing the opening is at an angle B to the axis of the opening. The angle B is generally 5 to 20 degrees, preferably 7 to 17 degrees, particularly 8 to 14 degrees, e.g. 10 degrees. Although the gripping surface (i.e. the gripping end) of the tooth may be flat and perpendicular to the base of the tooth, it is preferred that the surface of the tooth have an angle A which, when measured parallel to the axis of the opening, is 15 to 40 degrees, preferably 20 to 35 degrees, particularly 25 to 35 degrees, e.g. 30 degrees. The angle A is angled away from the opening so that when a pullout force is applied to the heating cable, the tooth will grip the heating cable more firmly. For some applications, the teeth may be serrated. In order to achieve adequate pullout strength, it is preferred that the each of the gripping teeth penetrate the innermost insulating jacket by at least 0.002 inch (0.050 mm), preferably at least 0.005 inch (0.130 mm), particularly at least 0.010 inch (0.25 mm).

Another component which acts to hold the heating cable securely in position is a sealing assembly, which may be used in conjunction with the connector or as part of another apparatus. The sealing assembly comprises a first component which is a hollow cylinder composed of a first material which is preferably a polymeric material although for some applications a metal may be suitable. At least part of the outer surface of the cylinder has screw threads. Although the first component can be a separate element, when the sealing assembly is used as part of the connector, the first component is generally the first inlet port. The second component can be mated to the first component; for example at least part of the second component can be inserted into the first component. The second component is a hollow cylindrical ring from which fingers or tines extend outwardly, perpendicular to the plane of the ring. The fingers act as a bearing surface to grip the heating cable or a grommet by uniformly distributing radial force. The fingers may have a uniform cross-section or may taper from the base to the tip. The size and shape are dependent on the size of the heating cable or grommet and the desired gripping force. The fingers are relatively flexible and are composed of a second material which is a polymeric composition. The first and second materials may be the same material or a different material. Polymeric materials suitable for use as either or both the first material and the second material include polyester, e.g. polybutylene terephthalate and polyethylene terephthalate, polycarbonate, polyamide, polypropylene, and polyethylene. For some applications in which it is important that the physical properties of the first and second materials be different, fillers, e.g. glass, carbon black, or talc, can be added to either or both the first and second materials. The second material has a flexural modulus of at most 500,000 psi, preferably at most 400,000 psi, particularly at most 300,000 psi, especially at most 200,000 psi when measured according to ASTM D790, and an ultimate elongation of at least 50%, preferably at least 100%, particularly at least 150%, especially at least 200% when measured according to ASTM D638. Generally the flexural modulus is at least 10,000 psi. The disclosures of ASTM D790 and ASTM D638 are incorporated herein by reference. In a preferred embodiment, the second material has a flexural modulus as measured by ASTM D790 which is at most 0.5 times, preferably at most 0.4 times, particularly at most 0.3 times that of the first composition. In addition in the preferred embodiment, it is preferred that the second material have an ultimate elongation as measured by ASTM D638 which is at least 2 times, preferably at least 5 times, particularly at least 10 times that of the first material.

The sealing assembly also comprises a third component which can be screwed onto the threads of the first component to hold the assembly in place. In a preferred embodiment, the third component is a nut having threads on its inner surface. The nut may comprise a single piece or two or more pieces and serves to compress the fingers when it is tightened. In addition to the fingers, the second component often comprises one or more positioning elements, e.g. locking arms, which project from the ring in a direction perpendicular to the plane of the ring. These locking arms ensure that the second component remains in position with the first component and does not rotate as the third component of the sealing assembly is tightened.

For many applications, it is preferred that the sealing assembly also comprise a fourth component which is a grommet. The grommet is held by the fingers of the second component and serves to seal the connector from moisture ingress at the point at which the heating cable enters. The surface of the grommet opening may be smooth, although to better accommodate different size heating cables, the inner surface may be ribbed.

For ease in shipping and installation, the first component may comprise a locking element, e.g. a raised detail or bump, which serves to mate to a first mating element on the third component. Once the components are positioned and the locking element is engaged, the components are in proper position for installation of the heating cable. There is thus no need at the time of installation to disassemble the third component nut completely as with conventional assemblies, allowing faster and easier assembly without the loss of components. Furthermore, because the strain relief and sealing functions are separated in the preferred embodiment (by using this sealing assembly rather than conventional assemblies), a softer grommet than that conventionally used is appropriate, thus allowing insertion of the heating cable without disassembling the assembly. Although the sealing assembly has been described with reference to the heating cable, similar sealing assemblies, with or without a grommet, can be used to position and/or seal the elongate components.

When the heating cable is surrounded by a metallic grounding braid, it is necessary to make a good electrical grounding connection to the braid as well as manage the location of the braid to avoid inadvertent electrical connections or physical contact. In order to achieve this, the connector may comprise a means for braid capture. In a preferred embodiment, the braid capture assembly fits within the first inlet port and is positioned between the sealing assembly and the connection module. The braid capture assembly comprises a metal receptacle in which the heating cable can be inserted. The receptacle is preferably an enclosed cylinder with entry and exit ports at opposite ends so that the heating cable can be inserted. Prior to insertion, the braid is removed from the part of the heating cable which will be positioned within the connection module and prepared for connection. This can be conveniently achieved by positioning a rigid clip, which may be ceramic or plastic but is preferably metal when a metal-metal-metal connection is desired, over the braid at the point at which the braid should end for successful connection, and folding the braid back over the clip. The heating cable with the clip is then inserted into the receptacle. At least one metal spring is attached to the receptacle, contacting the braid which is supported by the clip, and resulting in a desirable metal-metal-metal connection. The spring makes the electrical connection between the braid and the receptacle. The clip acts to resist the force of the spring to displace the braid. In some embodiments, two or more springs, preferably placed symmetrically around the heating cable, may be used. A metal ground pin makes electrical contact between the metal receptacle and the grounding element. The ground pin may be an integral part of the metal receptacle or it may be inserted into the receptacle by means of a spring at the end of the ground pin.

To ensure that moisture does not wick into the connector, an inner grommet may be installed between the braid capture assembly and the connector. Although the grommet may be of any shape, it is preferred that the inner surface be ribbed, thus allowing one size grommet to be useful for heating cables of different dimensions. For some applications it is preferred that a thin polymer membrane, e.g. 0.005 to 0.020 inch (0.13 to 0.51 mm), cover the opening of the grommet. The membrane should be thin enough, often about 0.010 inch (0.25 mm), to allow ready penetration without special tools as the heating cable is installed into the connector, but thick enough to act as a barrier to moisture before the heating cable is inserted. For ease of manufacture, the membrane is preferably made from the same material as the grommet. Membrane-covered grommets are especially useful for sealing unused inlet ports of multiple inlet port connectors.

The connector of the invention may also comprise other components. For example, one or more sheets made from a material such as mica or silicone rubber may be present to provide electrical insulation in the mated configuration.

The shell members and other components of the connector may comprise an insulated metal or ceramic but preferably comprise a polymer which has an impact strength of at least 5 foot-pounds when shaped into the connector configuration as measured by such tests as UL 746C, the disclosure of which is incorporated herein by reference. Preferred polymers are of light weight, can be shaped by injection- or transfer-molding or similar processing techniques, and will withstand required intermittent use and continuous use temperatures. Appropriate polymers include polycarbonate, nylon, polyester, polyphenylene sulfide, polyphenylene oxide, and other engineering plastics. Appropriate fillers and stabilizers may be present. To improve the impact strength of the connector, internal elements such as ribs and bosses and external elements such as grooves may be incorporated into the design of the shell members.

For some applications, it is desirable that some or all of the connector be filled with a viscous sealing material in order to provide a good environmental seal between the heating cable and the electrical component. Suitable materials include greases, adhesives, mastics, gels, and other materials, which, under compression, tend to conform to the surface of the heating cable and the component to make a seal. Particularly preferred as sealing materials are gels, e.g. silicone gels, such as those disclosed in U.S. Pat. Nos. 4,600,261 (Debbaut), 4,690,831 (Uken et al), 4,716,183 (Gamarra et al), 4,777,063 (Dubrow et al), 4,864,725 (Debbaut et al), 4,865,905 (Uken et al), 5,079,300 (Dubrow et al), 5,104,930 (Rinde et al), and 5,149,736 (Gamarra); and in International Patent Publication Nos. WO86/01634 (Toy et al), WO88/00603 (Francis et al), WO90/05166 (Sutherland), WO91/05014 (Sutherland), and WO93/23472 (Hammond et al). The disclosure of each of these patents and publications is incorporated herein by reference. The gel may be placed in one or both of the first and second shell members prior to use. When the shell members are formed into the mated configuration, the gel is displaced over the connection and the insulating jacket, as well any grounding braid which is inside the shell. The presence of the gel minimizes moisture ingress from outside the shell, from the heating cable, and from the grounding braid. Because the gel is flexible and neither bonds to the substrate nor forms a rigid casing around the connection, the gel allows the shell to be reentered and the connection to be monitored without destroying the connection or the connector. In some applications it is desirable to position gel at the end of the heating cable within the inner module cavity. This gel seals the end of the heating cable and prevents moisture from contacting the electrodes.

Figure 2:
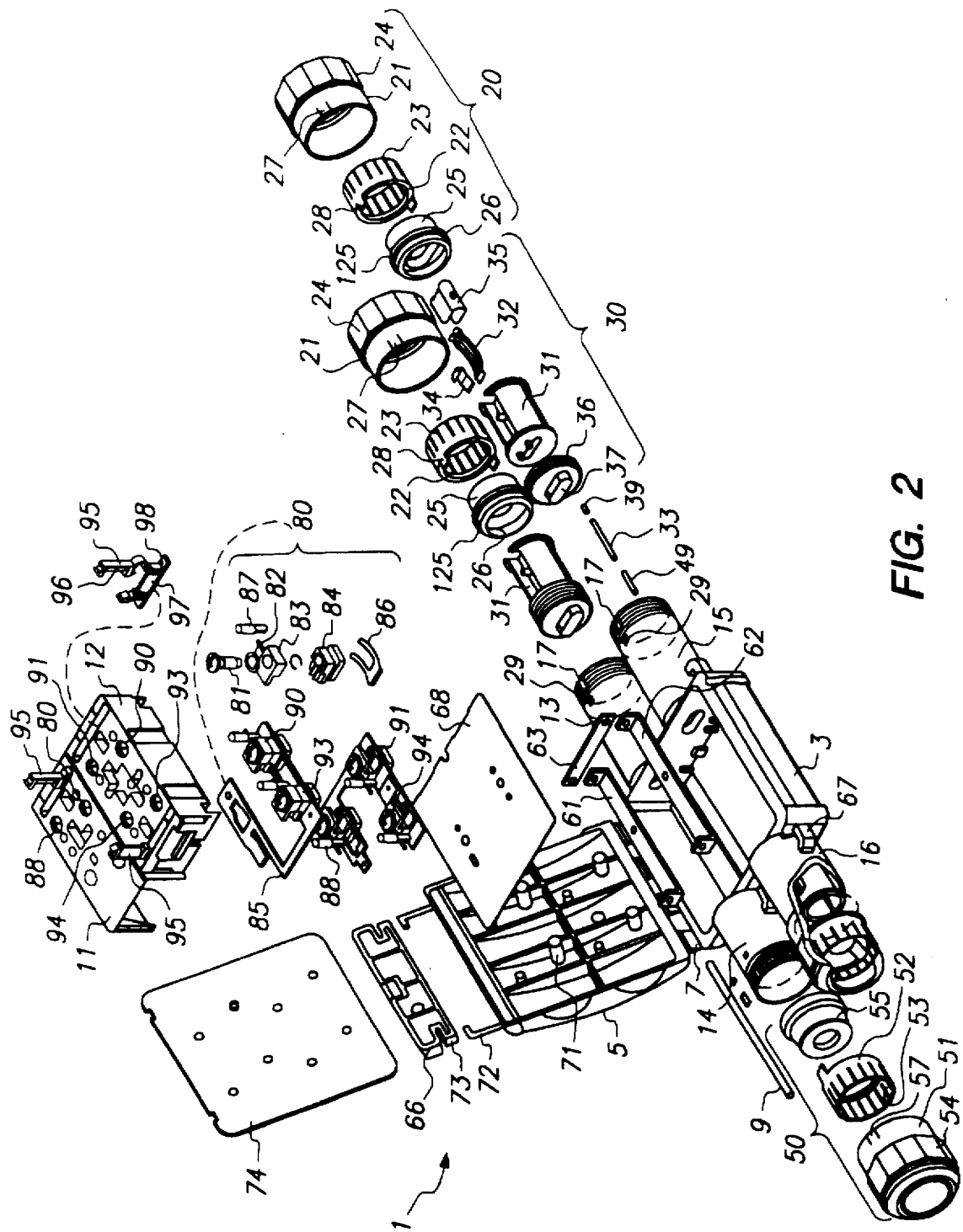
FIG. 2 is an exploded view of the connector of FIG. 1.

The invention is illustrated by the drawing in which FIG. 1 shows a perspective view of a connector of the invention 1 in the demated configuration and FIG. 2 is an exploded view of connector 1 of FIG. 1 in a demated configuration. The connector 1 shown in FIGS. 1 and 2 is suitable for connecting a first heating cable 40 in a powered tee configuration to three elongate electrical components: first elongate component 46 which is a power cable, second elongate component 47 which is a second heating cable, and third elongate component 48 which is a third heating cable. First shell member 3 is connected to second shell member 5 by means of hinges 7 and hinge pin 9. Positioning pins 71 protrude through lid gasket 74 and act to ensure proper positioning of the second shell member 5 and lid gasket 74 when mated. In the event that the connection means are incorrectly or incompletely assembled, the positioning pins 71 prevent the second shell member 5 from closing completely. To ensure tight closure of the shell members, lid snap lever 73 which is attached to lid bail 72 latches over lip 65 of first shell member 3. Reentry indicators 66 in the form of plastic snaps are positioned at the corners of lid snap lever 73. An unsuccessful attempt to reopen the mated first and second shell members 3,5 will result in a broken reentry indicator. Also present is insulating sheet 68 which acts to electrically insulate the connections. Attachment elements 67 are positioned along the sides of first shell member 3 and allow cable ties or wire to pass through when making attachment to the pipe, conduit, or other substrate. Attachment elements 67 also function to receive snaps for a snap-on mounting bracket, if present.

Positioned within first shell member 3 are a first connection module 11 and a second connection module 12. Both connection modules are made from a plastic which is transparent when molded. First connection module 11 contains a first connection means 80 and a second connection means 88, while second connection module 12 contains a fourth connection means 90, a fifth connection means 91, a seventh connection means 93, and a eighth connection means 94. The first, second, fourth, fifth, seventh, and eighth connection means 80,88,90,91,93,94 are insulation displacement connectors (IDC) which are positioned on two U-shaped elements, the first, fourth, and seventh connection means 80,90,93 on one, and the second, fifth, and eighth connection means 88,91,94 on the second. As shown in exploded view in FIG. 2, the IDC for first connection means 80 has a first piercing unit 83 positioned on top of a second piercing unit 84 and connected to the second piercing unit by means of a screw 81. (Only the top of screw 81 is visible in FIG. 1.) A washer 82 and a connection spring 86 are also part of the IDC, the connection spring 86 serving to make an electrical connection between the IDC and power bus 85. Also present on each of the first, second, fourth, fifth, seventh, and eighth connection means 80,88,90,91,93,94 is an indicator pin 87. The indicator pin 87 is initially positioned so that it protrudes above the top surface of the connection module. After the heating cable and the elongate components are installed in the connector and each IDC is properly tightened, the indicator pin 87 becomes flush with the top surface of the connection module, indicating correct installation. Also present within the first connection module 11 when assembled is a third connection means which is first grounding element 61. A grounding element cross piece 63 connects first grounding element 61 to second grounding element 62 which serves as the sixth connection means and is present. The ground pin 33, spring 39, spring 49, receptacle 31, spring 32, and clip 35 serve to connect second grounding element 62 to the grounding braid of the second heating cable 47. Similar elements are present for first heating cable 40 and third heating cable 48. Strain relief means 95 is inserted into a slot in the second connection module 12 and a similar strain relief means is present in the first connection module 11. A first gripping tooth 96 and a second gripping tooth 97 are positioned on a hinged assembly 98 and can lock onto the heating cable when it is inserted into the connector.

First inlet port 13 for first heating cable 40 and third inlet port 15 for second elongate component 47 are located adjacent to one another and on the opposite side of first shell member 3 from second inlet port 14 for first elongate component 46 and fourth inlet port 16 for third elongate component 48. When a sealing assembly is present to position and seal the heating cable and/or elongate components, the appropriate inlet port acts as the first component of the sealing assembly. To assist in making connection to the sealing assembly (half of which is indicated in exploded view by element 20), at least part of the outer surface of second inlet port 15 has screw threads. These screw threads receive a threaded nut 21 (the third component of the assembly), which may comprise one or more pieces. As shown in FIGS. 1 and 2, nut 21 comprises a gripping portion 24. The second component of the sealing assembly is a hollow ring 22 from which protrude fingers 23. Also present is grommet 25 which is held in position by fingers 23. Second heating cable 47 passes through grommet opening 26 which is configured to allow heating cables of different sizes to enter. Grommet 25 provides sealing in two locations: around the insulating jacket of the heating cable (or other component) and by means of grommet flange 125 at the perimeter of hollow ring 22. First mating element 27 on nut 21 mates with locking element 29 on first port 13 in order to ensure proper positioning on installation and to allow shipment of the connector with the parts held in place. Positioning elements 28 on ring 22 mate with recesses 17 (and one opposite which is not shown) serve to keep grommet 25 and ring 22 from rotating as nut 21 is tightened. A similar sealing assembly is present for first heating cable 40 and may be present for the first elongate component or any other elongate components.

Also present in connector 1 is a braid capture assembly 30 which fits inside third inlet port 15 and serves to control the position of the metallic grounding braid and make an electrical connection to the braid. Spring 32, made for example from beryllium copper, is positioned within metal receptacle 31, as is braid capture latch 34. After braid capture clip 35 is positioned on the heating cable it is also installed within metal receptacle 31. A metal ground pin 33 makes electrical connection to metal receptacle 31 by means of spring 39 and to second grounding element 62 by means of spring 49. An inner grommet 36, with membrane 37, is positioned between metal receptacle 31 and the shell wall at the bottom of third inlet port 15 on the second connection module 12 and acts to prevent moisture from reaching the electrical connections. Membrane 37 is not open until heating cable 47 is pushed through it. A similar braid capture assembly is present for first heating cable 40 as it is inserted into first inlet port 13, and for third heating cable 48 which is inserted into fourth inlet port 16.

Figure 3:
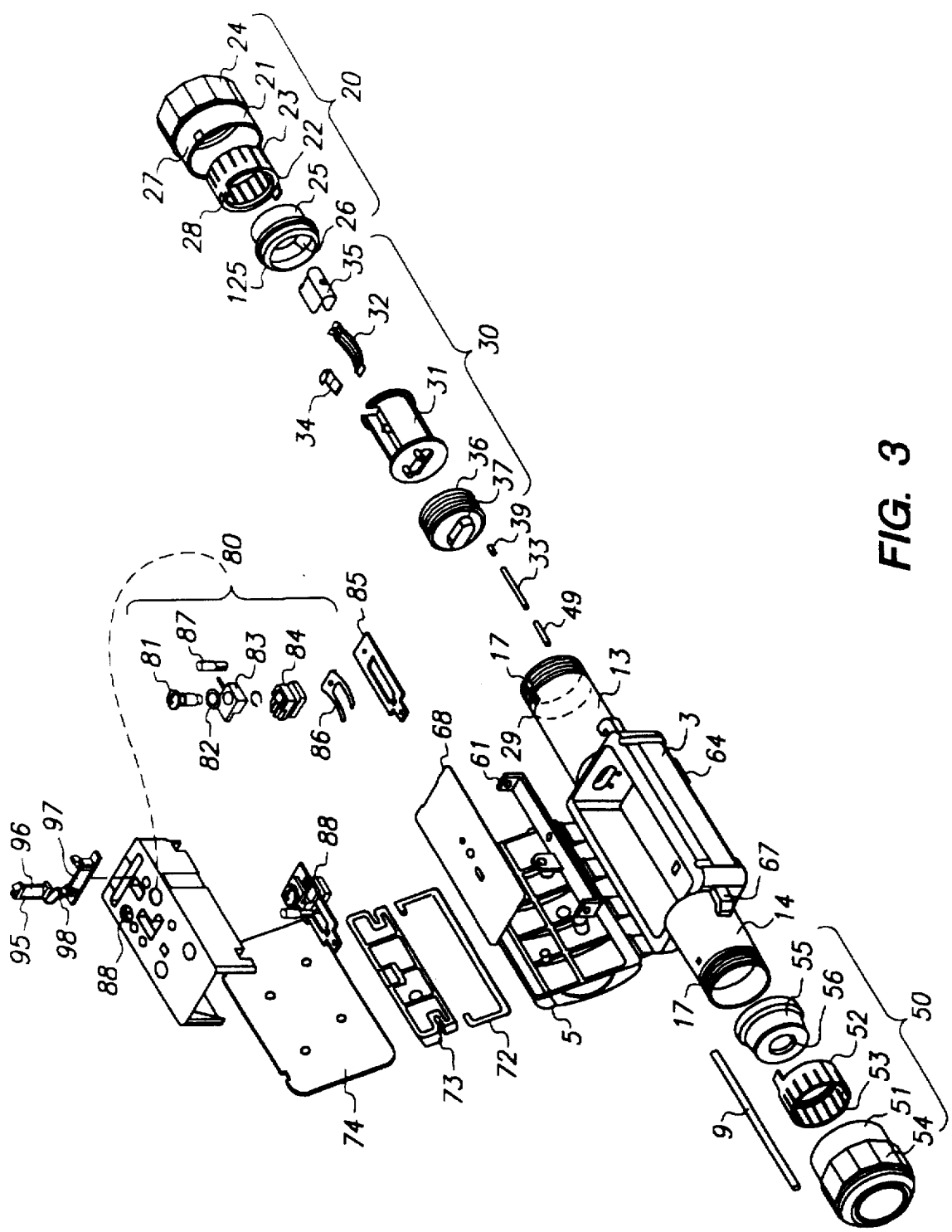
FIG. 3 is an exploded view of a connector of the invention suitable for connecting a heating cable to one elongate electrical component.

FIG. 3 is an exploded view of a connector 1 similar to that of FIG. 2 which is suitable for connecting a single heating cable to one elongate electrical component. Visible in FIG. 3 are supports 64 which allow the connector to stand above the substrate.

Figure 4:
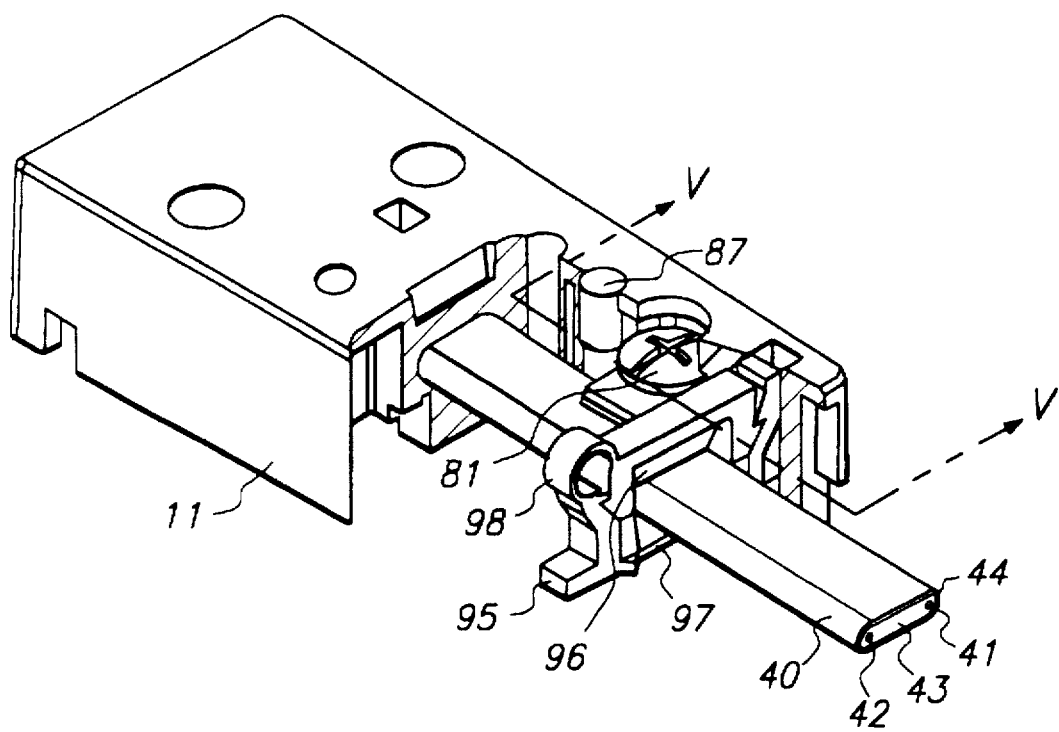
FIG. 4 is a perspective view with a partial cross-sectional view of the connection module of the invention with an installed heating cable.
Figure 5:
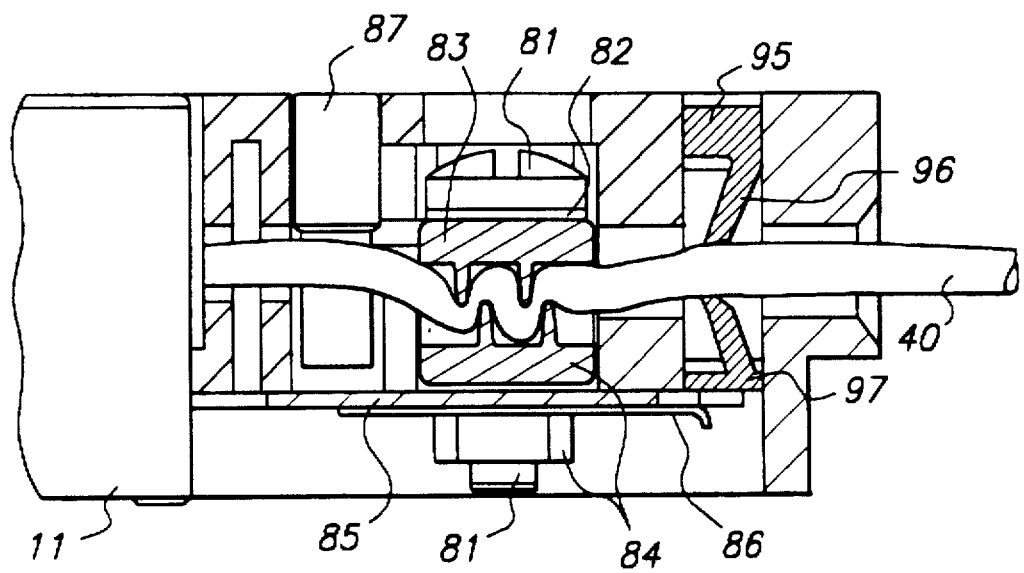
FIG. 5 is a cross-sectional view along line V—V of FIG. 4.

FIG. 4 is a perspective view partially cut-away of connection module 11 after first heating cable 40 has been installed. First and second elongate electrodes 41,42 are surrounded by conductive polymer composition 43. An insulating jacket 44 surrounds the conductive polymer. As shown in FIG. 5, a cross-sectional view along line V—V of FIG. 4, first and second gripping teeth 96,97 of the strain relief means 95 grip insulating jacket 44. First connection means 80, shown as an IDC, makes electrical contact to first electrode 41 by means of first and second piercing units 83,84 and screw 81. Because the IDC is adequately tightened, the top of indicator pin 87 is flush with the surface of first connection module 11.

Figure 6A:
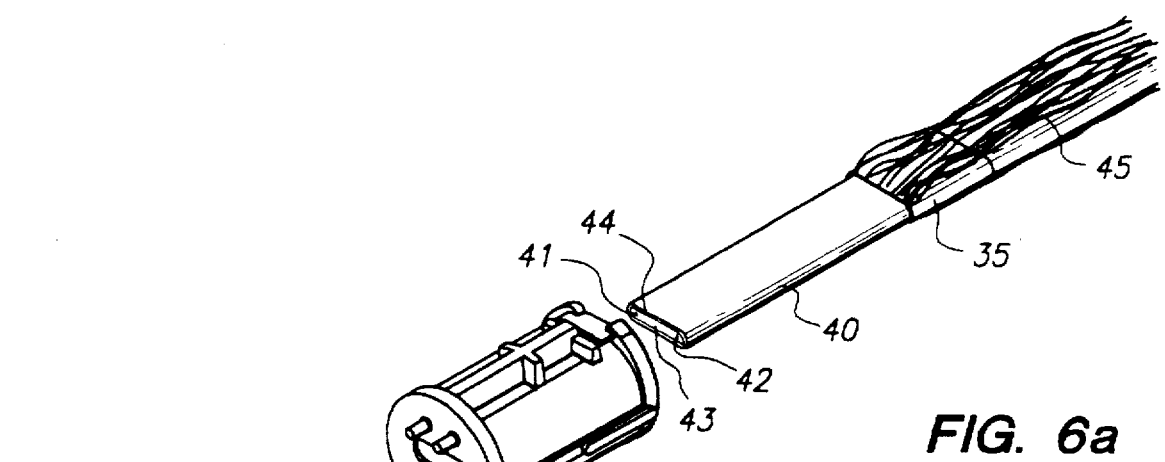
FIGS. 6a and 6b are perspective views of braid capture means used in the connector of the invention, where
Figure 6B:
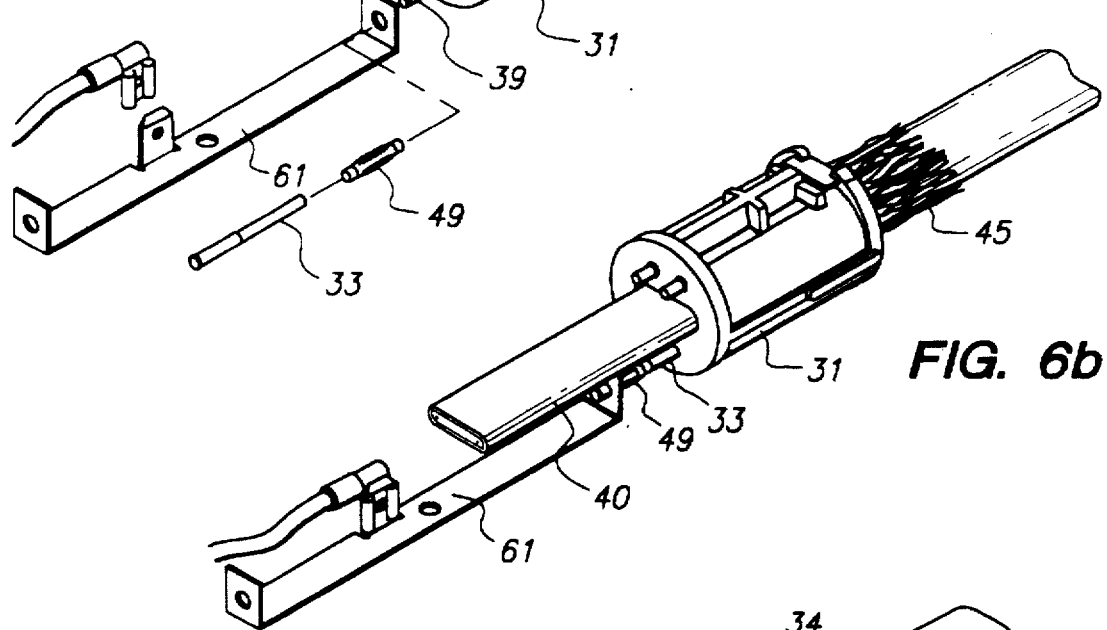

FIGS. 6a and 6b are perspective views which show in detail the braid capture assembly 30 of the invention. As shown in FIG. 6a, prior to insertion of first heating cable 40 into metal receptacle 31, braid capture clip 35 is positioned over the metallic grounding braid 45 and the braid is pulled back over the clip. First heating cable 40 is then inserted into metal receptacle 31, with proper positioning occurring when clip 35 is centered under spring 32 (see FIG. 7).

Figure 7:
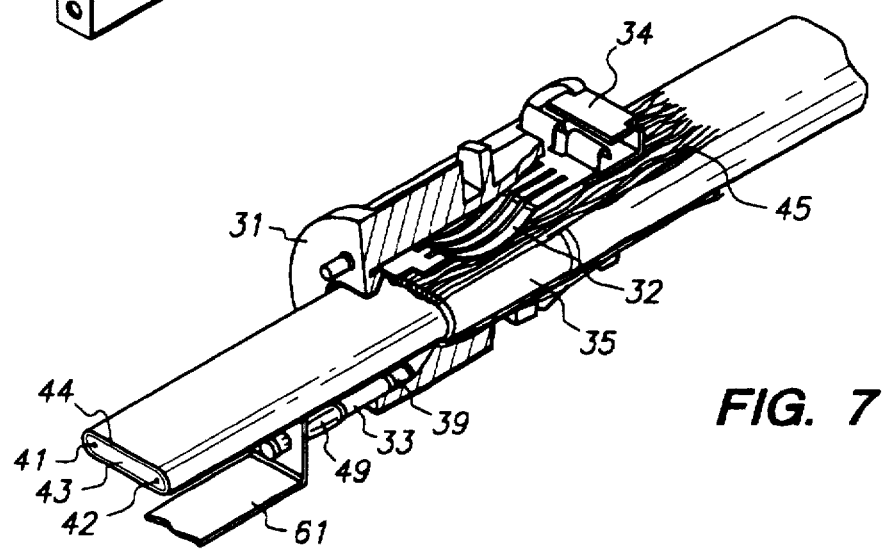
FIG. 7 is a perspective view with a partial cross-sectional view of the braid capture means shown in FIG. 6.

FIG. 7 is a perspective view partially cut-away of braid capture assembly 30 as shown in FIG. 6b following heating cable insertion. Visible in this figure are spring 32 which makes electrical connection to braid 45 and clip 35 to give a metal-metal-metal connection, and braid capture latch 34, a locking mechanism which holds first heating cable 40 properly positioned in metal receptacle 31. In this view, for clarity, no braid is visible at the side of clip 35, although in use, the braid generally is uniformly positioned around the clip. Metal ground pin 33 makes contact to braid receptacle 31 through spring 39 as well as to first grounding element 61 through spring 49.

Figure 8:
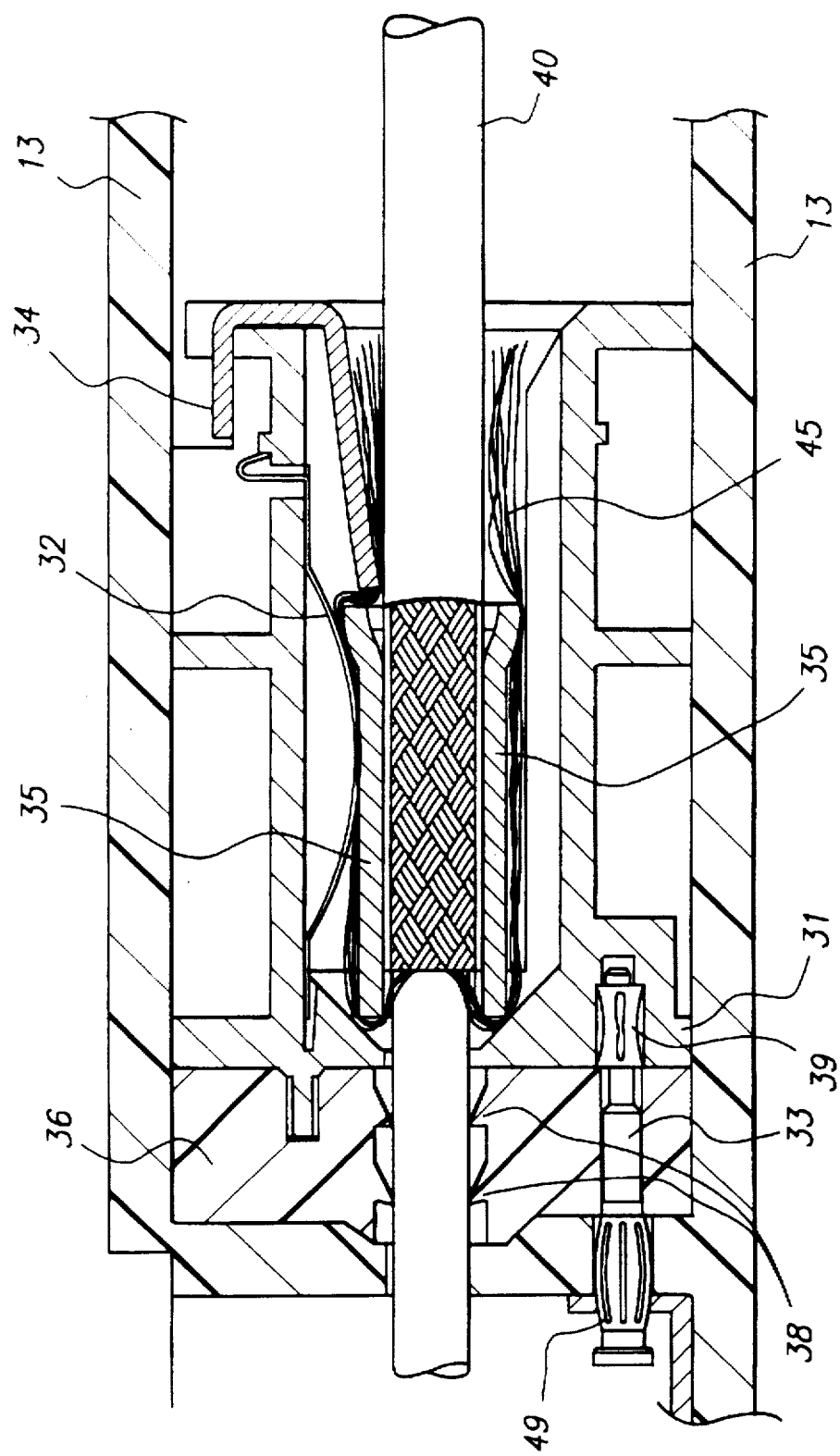
FIG. 8 is a cross-sectional view of the braid capture means installed in the first inlet port of the shell.

FIG. 8 shows in greater detail in a cross-sectional view the braid capture assembly 30 installed in first inlet port 13 of first shell member 3. Also shown is inner grommet 36, including ribs 38 positioned on the inner surface of grommet 36. These ribs act as flexible vanes to allow insertion of different size heating cables into grommet 36.

Figure 9:
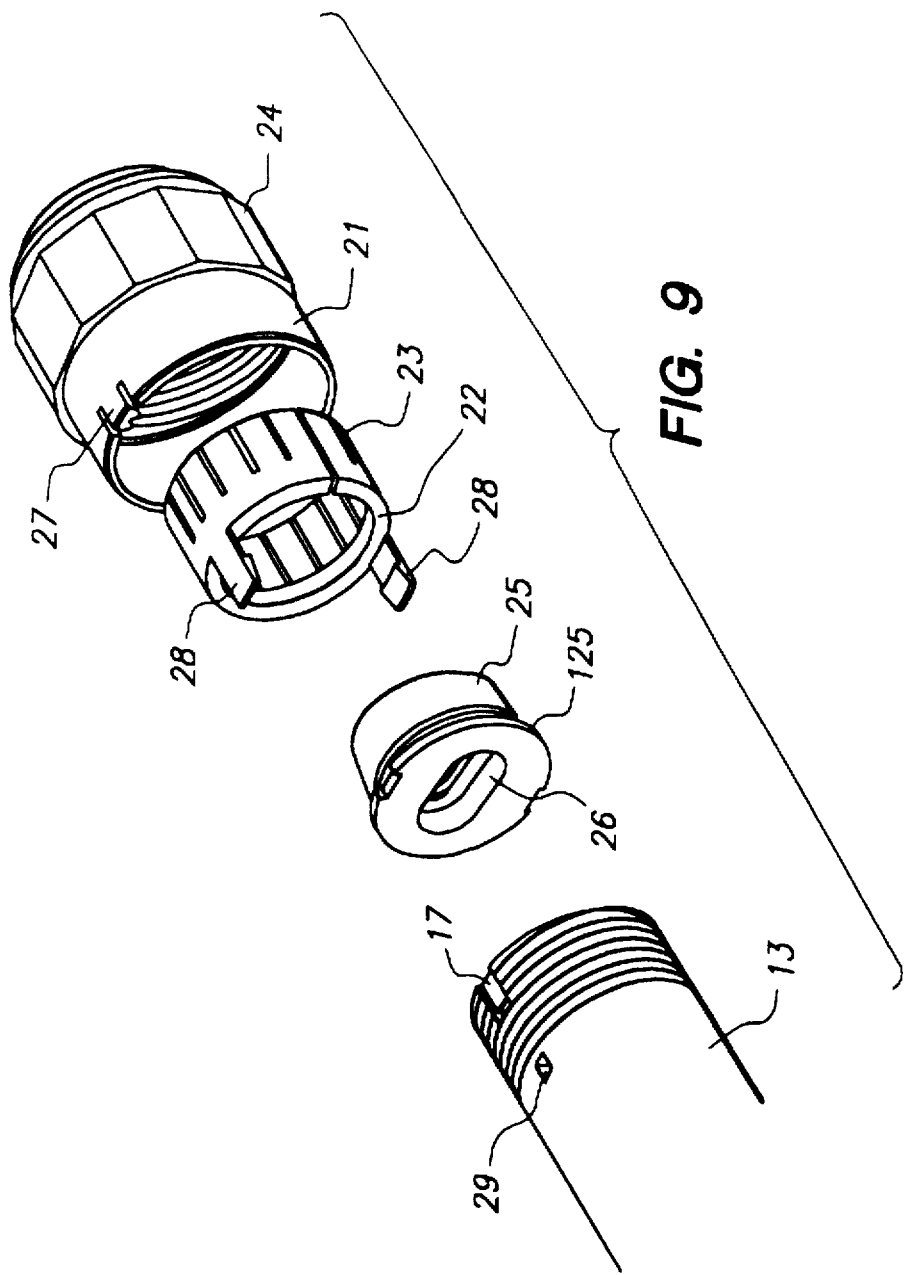
FIG. 9 is an exploded view of a sealing assembly of the invention.

FIG. 9 shows an exploded view of a sealing assembly 20 of the invention, including the first component which is first inlet port 13, the second component 22 which is cylindrical ring having attached fingers 23, the third component which is nut 21 (including gripping portion 24), and the fourth component which is grommet 25. First mating element 27 used in conjunction with locking element 29 on the first inlet port, allows proper installation, positioning and shipping of the preassembled assembly. Positioning element 28 mates with recess 17 and restricts the second component and grommet 25 from rotating when the sealing assembly is tightened.

Figure 10:
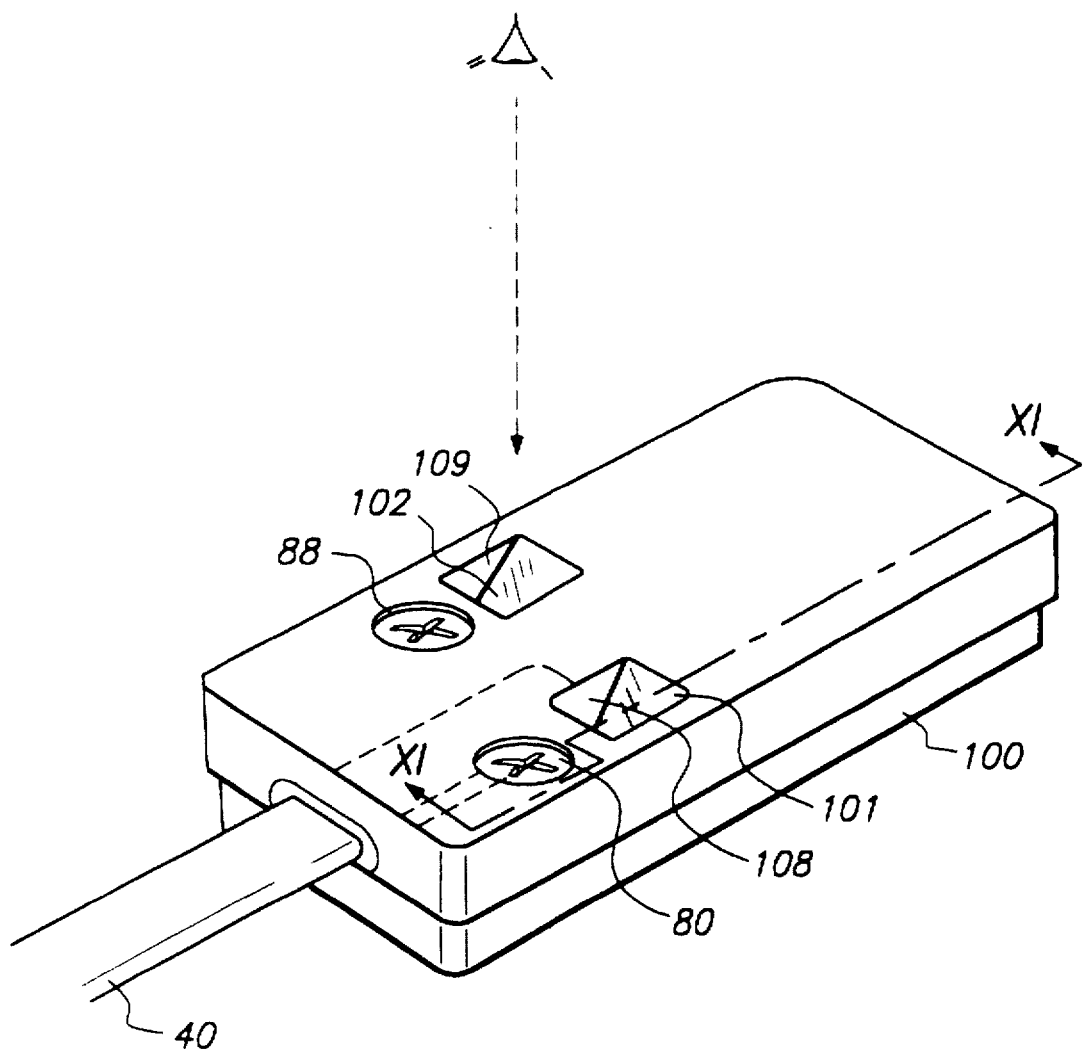
FIG. 10 is a perspective view of a connection module of the invention which contains a mirror for visual monitoring.
Figure 11A:
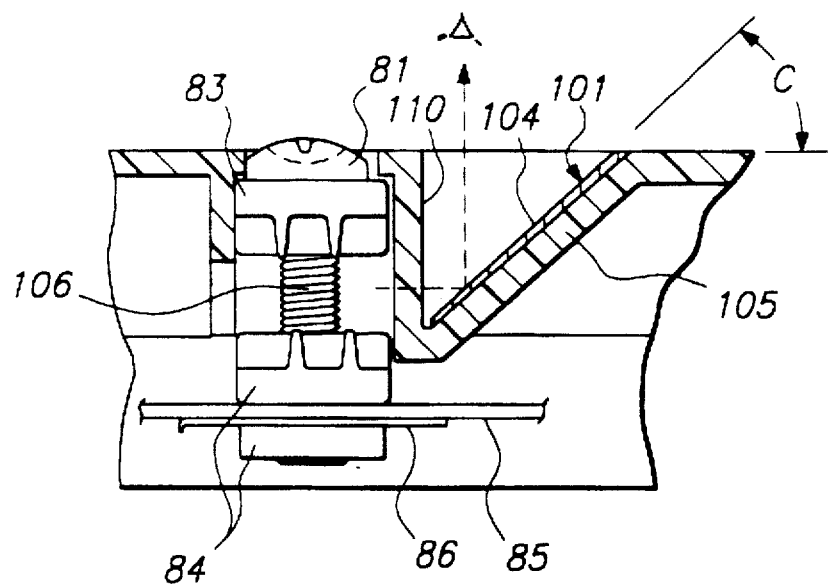
FIGS. 11a and 11b are cross-sectional views along line XI—XI of FIG. 10, where
Figure 11B:
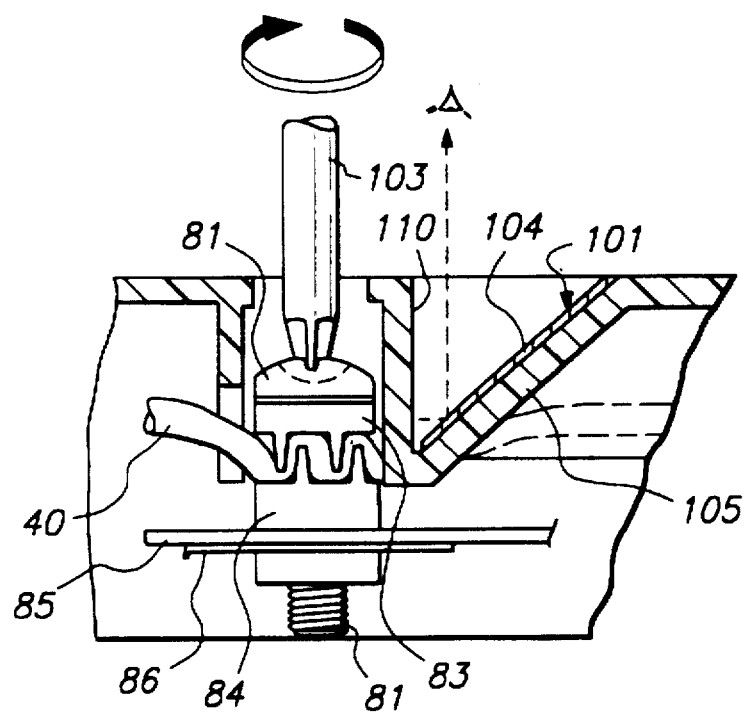
Figure 12A:
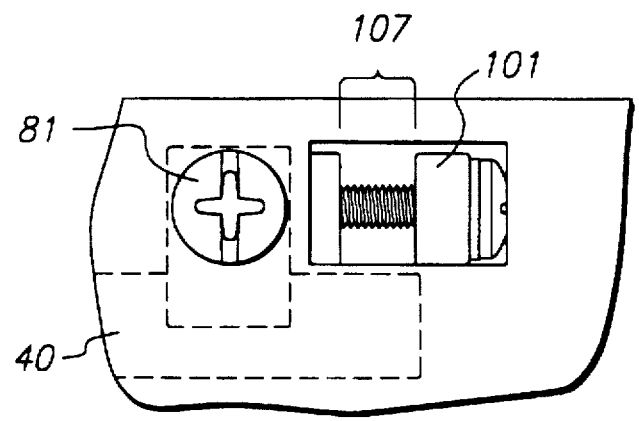
Figure 12B:
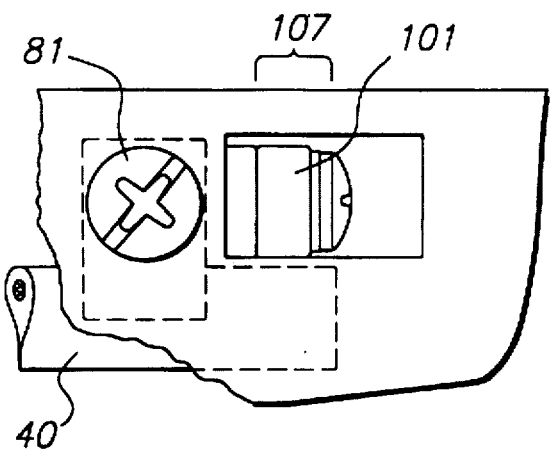

FIG. 10 is a perspective view of a connection module 100 of the invention which contains a mirror for visual monitoring. The embodiment illustrated shows a first mirror 101 positioned in first cavity 108 for the first connection means 80 and a second mirror 102 positioned in second cavity 109 for the second connection means 88. FIGS. 11a and 11b are cross-sectional views of first connection means 80 taken along line XI—XI of FIG. 10 before (FIG. 11a) and after (FIG. 11b) an electrical connection is made. FIGS. 12a and 12b are plan views of the surface of the connection module of FIG. 10 in which FIG. 12a shows the reflection in first mirror 101 before an electrical connection is made and FIG. 12b shows the reflection after an electrical connection is made. First mirror 101, shown here as a metal layer 104, is positioned on wall 105 of first cavity 108, and is attached to wall 105 by adhesive or other means, if necessary. Wall 110 of first cavity 108 is made from transparent plastic, although in other embodiments wall 110 need not be present or may be substantially opaque but have an opening or a window of transparent material. The angle C of wall 105 with respect to the laminar surface of the connection module is shown as approximately 45°. Prior to insertion of the heating cable 40, the screw threads 106 of first connection means 80 (shown here as an IDC) are visible in gap 107 (FIG. 12a). After heating cable 40 is inserted into first connection means 80, a screw driver 103 is used to tighten screw 81 of the IDC, allowing electrical connection to be made by the first and second piercing units 83 and 84 to the first elongate electrode of heating cable 40 (FIG. 11b). As shown in FIG. 12b, no screw threads are visible in gap 107, indicating a complete connection has been made.

Figure 13:
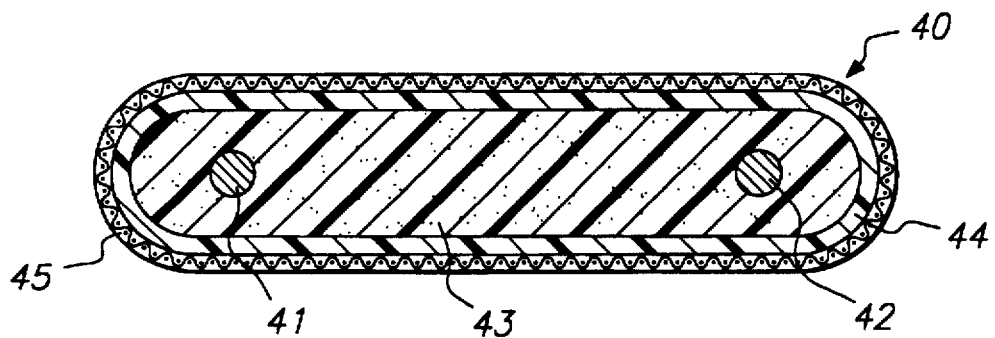
FIG. 13 is a cross-sectional view of a heating cable suitable for use with a connector or sealing assembly of the invention.

FIG. 13 shows in cross-section heating cable 40 in which first and second elongate electrodes 41,42 are surrounded by conductive polymer composition 43. Surrounding conductive polymer composition 43 are insulating jacket 44 and then metallic grounding braid 45.

What is claimed is:

1. A connector for connecting an end of a first elongate electrical heating cable to an end of a first elongate electrical component, said first heating cable comprising (a) first and second elongate electrodes, (b) a plurality of resistive heating elements connected in parallel between said electrodes, and (c) an insulating jacket surrounding said electrodes and heating elements, and said first electrical component comprising a first elongate member for connection to the first electrode and a second elongate member for connection to the second electrode, said connector comprising (1) first and second shell members which can be in one of
    (a) a demated configuration, and
    (b) a mated configuration in which the shell members are in contact with each other and form a shell having
        (i) a first inlet port for the first heating cable, the first inlet port being a hollow cylinder having an entry at one end and an outer surface at least a part of which comprises screw threads, and (ii) a second inlet port for the first electrical component;

(2) securing means for releasably maintaining the shell members in the mated configuration;

(3) a first connection means for connecting the first electrode to the first elongate member of said first electrical component within the shell;

(4) a second connection means for connecting the second electrode to the second elongate member of said first electrical component within the shell; and (5) a sealing assembly suitable for sealing the first heating cable at the entry of the first inlet port, said assembly comprising
    (a) a hollow cylindrical ring (i) suitable for mating to the first inlet port and (ii) from which fingers extend perpendicular to the plane of the ring,
    (b) a nut which can be screwed onto the threads of the first inlet port, and
    (c) a grommet which is held by the fingers and which seals around the first heating cable after installation, said first and second connection means being positioned within a first connection module which fits within the shell when the first and second shell members are in the mated configuration.

2. A connector according to claim 1 which further comprises (6) a third connection means for making an electrical connection within the shell between a first grounding element and a third elongate member of said first electrical component.

3. A connector according to claim 2 wherein the first heating cable further comprises a metallic grounding braid surrounding said insulating jacket.

4. A connector according to claim 3 wherein the first inlet port comprises a means for braid capture which comprises (a) a metal receptacle, (b) a spring which is attached to the metal receptacle and contacts and makes a connection to the grounding braid, and (c) a metal ground pin which provides electrical connection between the metal receptacle and the grounding element.

5. A connector according to claim 4 which further comprises a clip which makes physical contact to the braid and ensures contact of the braid with the spring.

6. A connector according to claim 3 wherein the first elongate electrical component is a second elongate electrical heating cable comprising (a) first and second elongate electrodes, (b) a plurality of resistive heating elements connected in parallel between said electrodes, (c) an insulating jacket surrounding said electrodes and heating elements, and (d) a metallic grounding braid surrounding said insulating jacket.

7. A connector according to claim 3 for connecting the electrical heating cable to second and third electrical heating cables, each of which comprises (a) first and second elongate electrodes, (b) a plurality of resistive heating elements connected in parallel between said electrodes, (c) an insulating jacket surrounding said electrodes and heating elements, and (d) a metallic grounding braid surrounding said insulating jacket, the connector having a first inlet port at a first end of the shell and a second inlet port at a second opposite end of the shell, which connector further comprises (7) a third inlet port for the second heating cable, said third port located at the first end of shell;

(8) a fourth inlet port for the third heating cable, said fourth port located at the second opposite end of the shell;

(9) a fourth connection means for connecting within the shell the first electrode of the second heating cable to (i) the first electrode of the third heating cable, (ii) the first electrode of the first heating cable, and (iii) the first elongate member of the the first electrical component;

(10) a fifth connection means for connecting within the shell the second electrode of the second heating cable to (i) the second electrode of the third heating cable, and (ii) the second electrode of the second heating cable, and (iii) the second elongate member of the first electrical component; and

(11) a sixth connection means for making an electrical connection between a second grounding element and (i) the grounding braid of the second heating cable, (ii) the grounding braid of the third heating cable, and (iii) the third connection means;

said fourth and fifth connection means being positioned within a second connection module which fits within the shell adjacent to the first connection module when the first and second shell members are in the mated configuration.

8. A connector according to claim 1 wherein the first and second connection means comprise insulation displacement connectors.

9. A connector according to claim 8 wherein each of the insulation displacement connectors comprises a first piercing unit and a second piercing unit, the first and second piercing units being operably connected by a screw.

10. A connector according to claim 1 wherein the connection module comprises means for strain relief.

11. A connector according to claim 10 wherein the strain relief means comprises at least two teeth suitable for gripping the insulating jacket of the first heating cable.

12. A connector according to claim 1 wherein the first connection module is transparent.

13. A connector according to claim 1 wherein the elongate electrical component is a grounded power cable.

14. A connector according to claim 1 which further comprises a visual indicator for monitoring the first connection means.

15. A sealing assembly which comprises (1) a first component which (a) is a hollow cylinder having an outer surface at least a part of which comprises screw threads, and (b) is composed of a first material;

(2) a second component which (a) is a hollow cylindrical ring from which fingers extend perpendicular to the plane of the ring, said fingers being composed of a second material which (i) is a polymeric composition and (ii) has a flexural modulus of at most 500,000 psi and an ultimate elongation of at least 100%, and (b) is suitable for mating to the first component; and (3) a third component which (a) is a nut, and (b) can be screwed onto the threads of the first component.

16. An assembly according to claim 15 which further comprises (4) a grommet which can be held in position by the fingers of the second component.

17. A connector for making an electrical connection to an elongate electrical component, said connector comprising (1) a connection module;

(2) a connection means for connecting to a first electrode of the elongate electrical component, said connection means being inserted in the module; and (3) a mirror which (a) is inserted in the module, and (b) is positioned so that the connection means can be observed from outside the module.

18. A connector according to claim 17 wherein the connection means comprises an insulation displacement connector.

19. A connector according to claim 17 wherein the mirror comprises aluminized polyester.

20. A connector according to claim 17 wherein at least part of the connection module is transparent.

* * * * *

UNITED STATES PATENT AND TRADEMARK OFFICE
CERTIFICATE OF CORRECTION

PATENT NO.    : 5,756,972

INVENTOR(S)   : Vranicar et al.

DATED         : May 26, 1998

It is certified that error appears in the above-identified patent and that said Letters Patent is hereby corrected as shown below:

Cover Page    References Cited [56], Foreign Patent Documents, line 6, replace "4/1981" by --4/1991--.

Cover Page    References Cited [56], Foreign Patent Documents, line 8, replace "WO86/00603" by --WO88/00603--.

Cover Page    References Cited [56], Other Publications, line 4, replace "Cable Wire" by --Cable, Wire--.

Cover Page    References Cited [56], Other Publications, line 5, replace "Bettss" by --Betts--.

Cover Page    , References Cited [56], U.S. Patent Documents, left Column, line 6, as a new line before "3,564,117 ... 174/89", insert --3,448,430  6/69  Kelly --.

Cover Page    Abstract [57], line 9, after "element", insert --for connection--.

Column 3, line 59, replace "made." by --made; and--.

Signed and Sealed this

Seventeenth Day of November, 1998

Attest:

BRUCE LEHMAN

*Attesting Officer*     *Commissioner of Patents and Trademarks*